United States Patent
Belhassen (10) Patent No.: US 10,354,546 B2
(45) Date of Patent: Jul. 16, 2019

(54) SEMI-PERMANENT MAKEUP SYSTEM AND METHOD

(71) Applicant: Naomi Belhassen, Winnipeg (CA)

(72) Inventor: Naomi Belhassen, Winnipeg (CA)

( * ) Notice: Subject to any disclaimer, the term of this patent is extended or adjusted under 35 U.S.C. 154(b) by 107 days.

(21) Appl. No.: 15/361,299

(22) Filed: Nov. 25, 2016

(65) Prior Publication Data

US 2018/0151086 A1 May 31, 2018

(51) Int. Cl.
| | |
|---|---|
| *G06T 19/20* | (2011.01) |
| *G09B 9/00* | (2006.01) |
| *A45D 44/00* | (2006.01) |
| *G09B 5/02* | (2006.01) |
| *G09B 19/00* | (2006.01) |
| *G06F 3/0482* | (2013.01) |
| *G06F 3/0484* | (2013.01) |

(52) U.S. Cl.
CPC ............ *G09B 9/00* (2013.01); *A45D 44/005* (2013.01); *G06T 19/20* (2013.01); *G09B 5/02* (2013.01); *G09B 19/00* (2013.01); *G09B 19/0076* (2013.01); *G06F 3/0482* (2013.01); *G06F 3/04845* (2013.01); *G06T 2200/24* (2013.01); *G06T 2219/028* (2013.01); *G06T 2219/2012* (2013.01)

(58) Field of Classification Search
USPC ................................................. 382/154, 203
See application file for complete search history.

(56) References Cited

U.S. PATENT DOCUMENTS

| | | | |
|---|---|---|---|
| 7,634,103 B2 | 12/2009 | Rubinstenn | |
| 2003/0063794 A1* | 4/2003 | Rubinstenn | A45D 44/005 382/154 |
| 2010/0018542 A1* | 1/2010 | Konrad | A45D 40/30 132/200 |
| 2012/0223956 A1* | 9/2012 | Saito | A45D 44/005 345/582 |
| 2014/0016823 A1* | 1/2014 | Ye | G06T 19/20 382/103 |
| 2016/0042224 A1* | 2/2016 | Liu | G06K 9/00248 382/203 |
| 2016/0042557 A1* | 2/2016 | Lin | G06T 7/73 345/426 |
| 2016/0328632 A1* | 11/2016 | Choe | H04N 5/23219 |
| 2017/0049217 A1* | 2/2017 | Ahn | A45D 40/30 |
| 2017/0076474 A1* | 3/2017 | Fu | G06T 11/00 |

* cited by examiner

*Primary Examiner* — Masud Ahmed
(74) *Attorney, Agent, or Firm* — Adrian D. Battison; Ade & Company Inc; Ryan W. Dupuis (57) ABSTRACT

A semi-permanent makeup system includes a client database, a makeup simulation unit, and a data control unit. The semi-permanent makeup system is useful for allowing users to apply semi-permanent makeup on a three-dimensional client face prior to a procedure, helping technicians accurately create a stencil, comparing results with the three-dimensional client face having the semi-permanent makeup client-user requests applied, and analyzing results prior to touchup procedures.

20 Claims, 5 Drawing Sheets

SEMI-PERMANENT MAKEUP SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of software programs of existing art and more specifically relates to a semi-permanent makeup system.

2. Description of Related Art

Microblading is a semi-permanent eyebrow tattoo that realistically resembles hair follicles. In North America, microblading is performed manually by utilizing a disposable razor on the tip of an applicator that resembles a scalpel. First, the eyebrow area is thoroughly numbed with cream. Then, the disposable razor located at the tip of a blade is maneuvered to create miniscule strokes that break through the dermis of the skin where the eyebrow hairs are desired. Upon completion, the technician evenly fills the area with elongated gashes that are covered with ink. The lines imitate the direction and length of actual hairs in the respected area. The ink is inserted into the skin by manually depositing pigment superficially in the upper region of the dermis. The end result resembles natural looking eyebrows that can last longer than a year with touchups needed once every few months for maintenance. Microblading is a relatively new and rapidly growing segment of the permanent makeup industry in the US, Asia, Middle East and in various European countries. It is currently the fastest growing segment of the Cosmetic Tattoo Industry. The growth in interest in the US over the last 15 months is exponential with a lot of variation with the quality of the service. Everywhere that offers the service relies on the technicians' skills. Quality varies tremendously because it relies on handwork from the technician and the training for them to do this service lasts from a few days to a week in length with no current requirements in North America aside from health safety.

U.S. Pat. No. 7,634,103 to Gilles Rubinstenn relates to an analysis using a three-dimensional facial image. The described analysis using a three-dimensional facial image includes methods and systems related to enabling an analysis using a three-dimensional facial image. One of the methods involves facilitating construction of a three-dimensional facial image using at least captured image of a subject's face. The method also involves facilitating a simulation of use of an aesthetic feature on the three-dimensional facial image and/or processing of the three-dimensional facial image to enable a beauty analysis.

BRIEF SUMMARY OF THE INVENTION

In view of the foregoing disadvantages inherent in the known computer program art, the present disclosure provides a novel semi-permanent makeup system. The general purpose of the present disclosure, which will be described subsequently in greater detail, is to provide a semi-permanent makeup system.

A semi-permanent makeup system is disclosed herein. The semi-permanent makeup system includes a server, and a computer program including a client database, a makeup simulation unit, and a data control unit. The semi-permanent makeup system comprises the server and the computer program. The computer program comprises the client database, the makeup simulation unit and the data control unit. The client database obtains and stores three-dimensional client face shape data regarding a client-user. The three-dimensional client face shape data is created from a plurality of videos and images of the client-user. The makeup simulation unit may be used for applying semi-permanent makeup to the three-dimensional client face shape data based on the client-user requests.

The computer program displays, on a displaying device such as a tablet or iPad, the simulated effect of the semi-permanent makeup system based on the user requests. The makeup simulation unit allows the client-user to create eyebrows based on current makeup application and select eyebrow colors. The semi-permanent makeup comprises lip enhancing makeup, eyebrow makeup, receding hairline correction, and baldness correction tattoos. The makeup simulation unit provides client-users with various color, shape and style selections for creating a desired semi-permanent makeup result. The makeup simulation unit calculates and provides the colors, the shapes and the style selections based on facial shape and face features. The makeup simulation unit allows the client-user to view semi-permanent makeup requests on the three-dimensional client face from various viewpoints. The computer program further displays three-dimensional client face in a plurality of differing virtual perspectives and settings from an outside perspective. The three-dimensional client face shape is rotatable by 360 degrees for viewing desired procedure results. The data control unit analyzes user input.

The semi-permanent makeup system uses the semi-permanent makeup requests to create the three-dimensional client face with the semi-permanent makeup applied and a technician then creates a stencil. The client database stores images of the client-users during stages of procedures for referring to after the procedure and comparing result accuracy to client requests and input prior to the procedures. The computer program compares and analyzes results of the procedure with the client-user requests. The computer program provides split screen options for comparing images of the three-dimensional client face with semi-permanent makeup options applied. The makeup simulation unit analyzes the condition of the client-user's semi-permanent makeup application in order to accurately touch up areas. The semi-permanent makeup system allows the users to apply semi-permanent makeup on the three-dimensional client face prior to a procedure, helps technicians accurately create a stencil, compare results with the three-dimensional client face having the semi-permanent makeup client-user requests applied, and analyzes results prior to touchup procedures. The final procedure provides the tangible result in that a client has the semi-permanent makeup applied as selected.

According to another embodiment, a semi-permanent makeup system is also disclosed herein. The semi-permanent makeup system includes a step one, creating a three-dimensional facial image of a client-user; step two, displaying the three-dimensional facial image of the client-user on a displaying device; step three, selecting semi-permanent make-up options; step four, applying the semi-permanent make-up options on the three-dimensional facial image of the client-user; step five, constructing a stencil for application of the semi-permanent make-up options on the client-user; step six, comparing procedure results to the three-dimensional facial image of the client-user; step seven, analyzing procedure results; and step eight, scanning prior to follow-up touch-ups of semi-permanent makeup.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a semi-permanent makeup system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a computer program and more particularly to a semi-permanent makeup system as used to improve microblading results.

Generally, semi-permanent makeup system is disclosed herein. A 3D image of a client's face is taken creating an interactive digital image on a tablet that allows clients to move their faces 180 degrees. By brushing their finger to the left or to the right, they are able to turn their image and see their faces from a variety of perceptions. According to the shape of their face and features, corresponding eyebrow shapes are calculated based on current makeup application suggestions. The client can then see what each brow would look like applied to their image.

The client is able to split the screen into segments to compare the images to each other at the same time. Then, the client can continue to alter the image of their brow as they desire by using their finger tips on the computer tablet. Lastly, the client can choose and apply the color they prefer from the list of options on the screen.

The person doing the tattooing stencils an outline of the brow selected on the face of the client that is based on the design of the image created by the client. When that is finished, the technician may take another digital image. This second image will appear more like a stencil, and is digitally overlapped with the image chosen by the client. The digital overlapping checks the accuracy of the technician's design. This enables quality control of the work of technicians which is desirable.

After the semi-permanent tattoo is completed, an image of the finished work is taken. The images are overlapped again, the original one chosen by the client and the end result shown. The second of which will appear to be in a weaker image (more of a stencil). This comparison measures the outline and the hair density. There is a need to be able to see digitally that there are not areas that have hair scarcity or too much density. The hair density needs to be evenly distributed, and semi-permanent makeup system will be able to check that as well as check the color similarity to the originally chosen color, and recheck the shape to ensure it resembles what the client chose. After the comparison, a digital percentage number appears at the bottom of the tablet/app that calculates the similarity. The calculation appears as an escalating percentage indication. It calculates how much the images match each other. For example, it will state, "98% accuracy". This number will not be completely accurate because the area that had this technique still needs to be properly healed to be able to resemble the image in the photo, so it can't be exact. This number will be used to give an estimation to the quality and accuracy of the work.

The semi-permanent makeup system stores images of clients in a data base. When a client wants to come in for a touch up, when the semi-permanent tattoo is fading, then the current image of the client may be overlapped with the image of their work that they previously had done. A corresponding digital calculation may be created to show where the touchups are needed to maintain the same look and to what degree touchups are suggested. For example, areas that need a touchup more than others may appear as a darker color such as dark red and areas that need a slight touch up may appear as a lighter color such as light red. The color may vary to the degree that the touch up is needed. This may also be used as a guide for the technician. The accuracy of the touchup then undergoes the same checking to ensure that the touchups were done properly and accurately.

The present invention may include a feature called "Passers View". This feature allows the client to see the image of their new face before they have the procedure in a social environment. For example, at an office party, walking the street in Paris, in a café reading a book.

The semi-permanent makeup system may also provide lip extension and coloring. Visual manipulation of lip size by a few millimeters will be done, with added shape emphasis, and added feature to change the coloring with the same semi-permanent microblading technique. By creating a semi-permanent line a few millimeters above a lip and a few millimeters below a lip creating more shape definition and adding a semi-permanent lip color, people that feel like they lack lip area can feel more confident. The computer program is able to extend the lip area a little and be malleable by touching the screen or maneuvering a mouse. The area can be filled with the color that the client chooses to give them an idea of what we can achieve visually with semi-permanent lip tattooing. It will give the client a visual representation of the results before they have the procedure.

The semi-permanent makeup system may also be used for micro-blading for men with shaved heads and receding hairlines. The computer program will show men what they would look like with stubble in the area where they are bald. Semi-permanent makeup system may create a digital image that will show that what they can expect to look like with tattooed stubble in the area where they are bald that will imitate natural hair stubble.

Semi-permanent makeup system makes a 3D image of the client and then creates suggestions for microblading eyebrows according to their face shape. The client may then choose the image they want to use for their eyebrow and see what they are expected to look like after the procedure before it is done.

Figure 1:
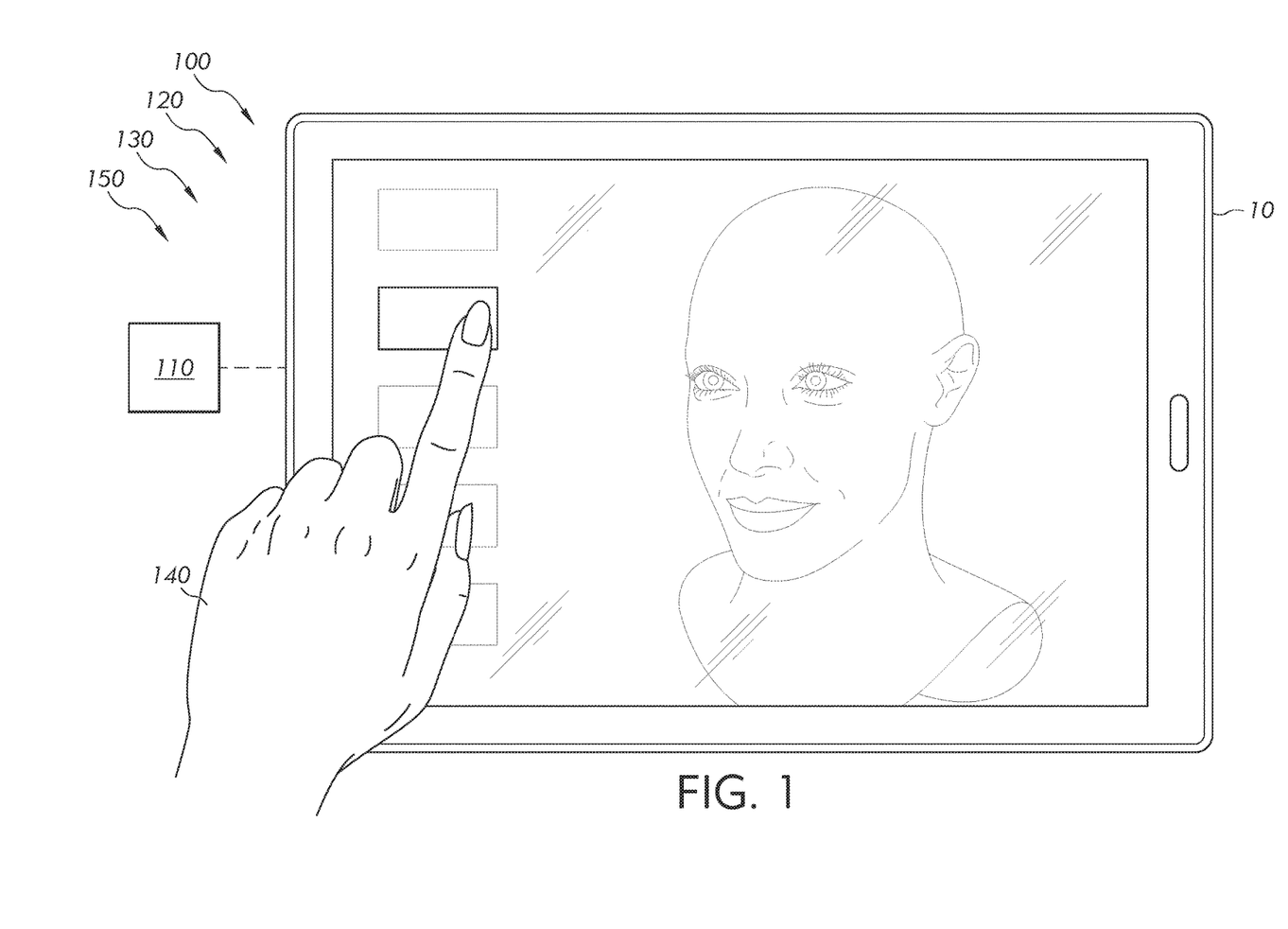
FIG. 1 is a perspective view of the semi-permanent makeup system during an 'in-use' condition, according to an embodiment of the disclosure.

Referring now more specifically to the drawings by numerals of reference, there is shown in FIGS. 1-4, various views of a semi-permanent makeup system 100. FIG. 1 shows a semi-permanent makeup system during an 'in-use' condition 150, according to an embodiment of the present disclosure. Here, the semi-permanent makeup system may be beneficial for use by a user 140 to create a 3-D client face for simulating the application of semi-permanent makeup prior to a procedure. As illustrated, the semi-permanent makeup system 100 may include client database 130, makeup simulation unit 160, and data control unit 170. The semi-permanent makeup system 100 comprises the server 110 and the computer program 120. The computer program 120 comprises the client database 130, the makeup simulation unit 160 and the data control unit 170. The client database 130 obtains and stores three-dimensional client face shape data regarding a client-user 140. The three-dimensional client face shape data is created from a plurality of videos and images of the client-user. The makeup simulation unit 160 is used for applying semi-permanent makeup to the three-dimensional client face shape data based on the client-user 140 requests.

Figure 2:
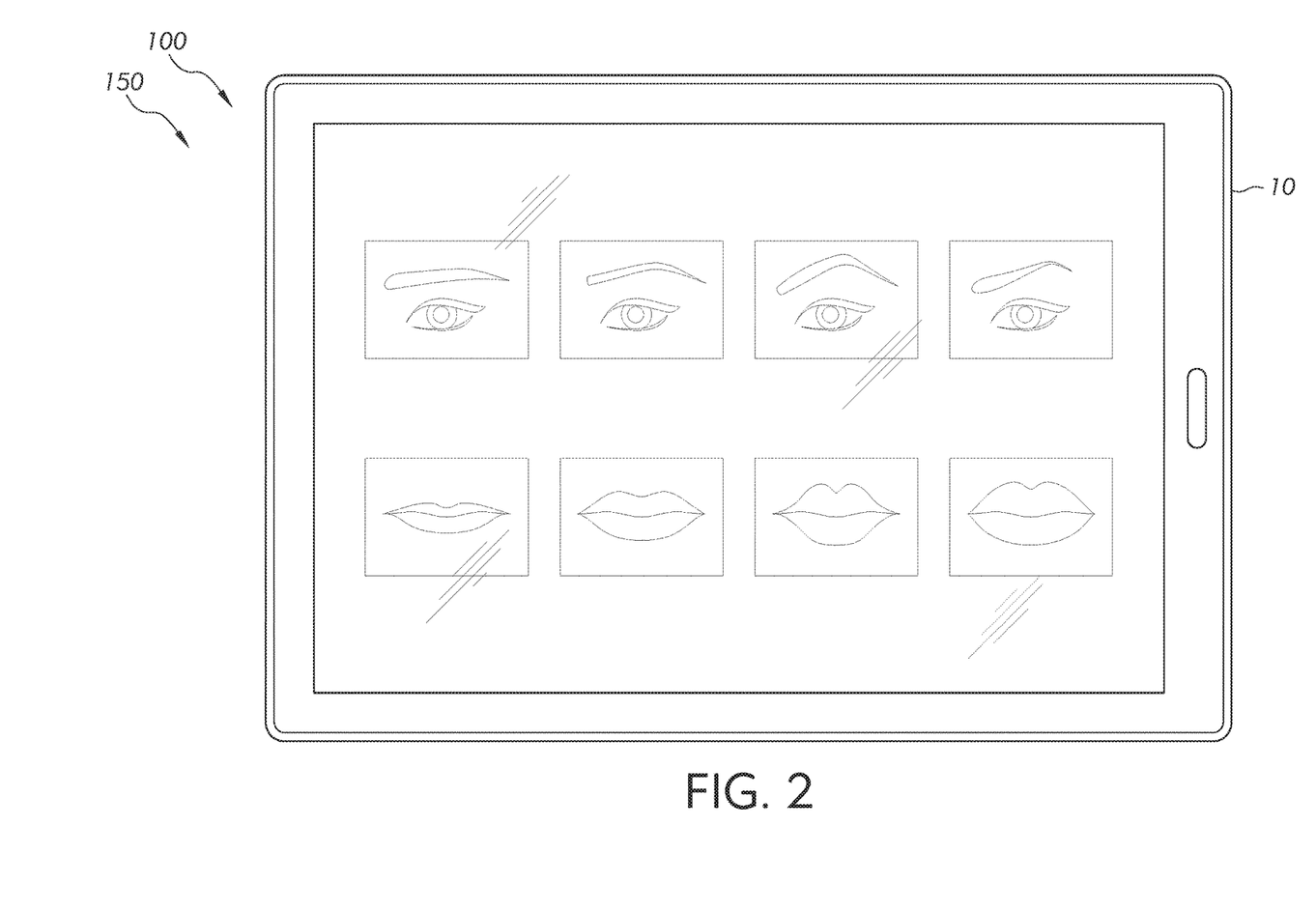
FIG. 2 is a perspective view of the semi-permanent makeup system of FIG. 1, according to an embodiment of the present disclosure.

FIG. 2 shows the semi-permanent makeup system of FIG. 1, according to an embodiment of the present disclosure. The semi-permanent makeup system 100 uses the semi-permanent makeup requests to create the three-dimensional client face with the semi-permanent makeup applied and a technician then creates a stencil. The client database 130 stores images of the client-users 140 during stages of procedures for referring to after the procedure and comparing result accuracy to client-user 140 requests and input prior to the procedures. The computer program 120 compares and analyzes results of the procedure with the client-user 140 requests. The computer program 120 may also provide split screen options for comparing images of the three-dimensional client face with semi-permanent makeup options applied. The makeup simulation unit 160 analyzes the condition of the client-user's 140 semi-permanent makeup application in order to accurately touch up areas. The semi-permanent makeup system 100 allows the client-users 140 to apply semi-permanent makeup on the three-dimensional client face prior to a procedure, helps technicians accurately create a stencil, compare results with the three-dimensional client face having the semi-permanent makeup client-user 140 requests applied, and analyzes results prior to touchup procedures.

Figure 3:
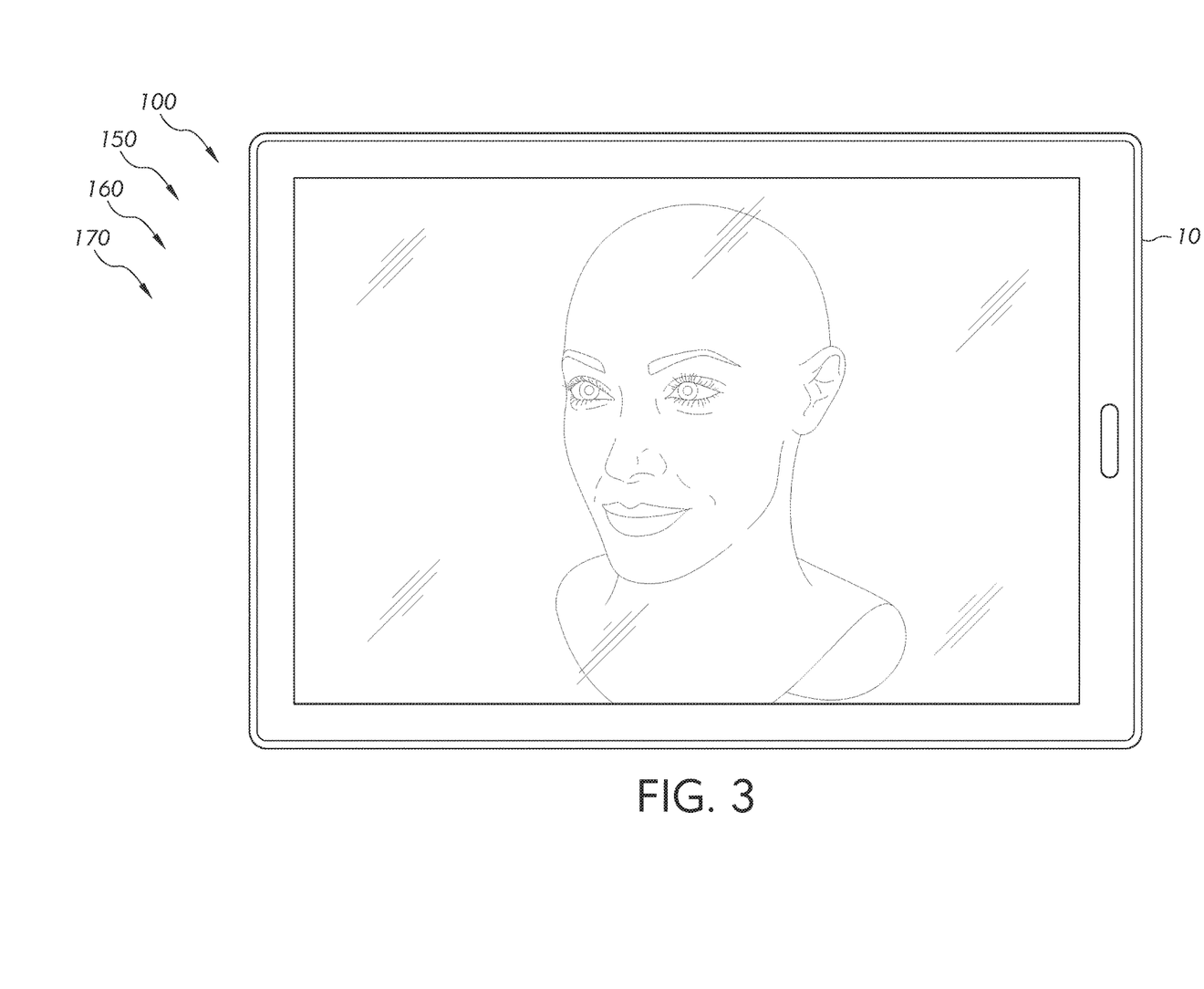
FIG. 3 is a perspective view of the semi-permanent makeup system of FIG. 1, according to an embodiment of the present disclosure.

FIG. 3 is a perspective view of the semi-permanent makeup system of FIG. 1, according to an embodiment of the present disclosure. The computer program 120 displays, on a displaying device 10, simulated effect of the semi-permanent makeup system 100 based on the user requests. The displaying device 10 comprises a tablet. The makeup simulation unit 160 allows client-user 140 to create eyebrows based on current makeup application and select eyebrow colors. The semi-permanent makeup comprises lip enhancing makeup, eyebrow makeup, receding hairline correction, and baldness correction tattoos.

Figure 4:
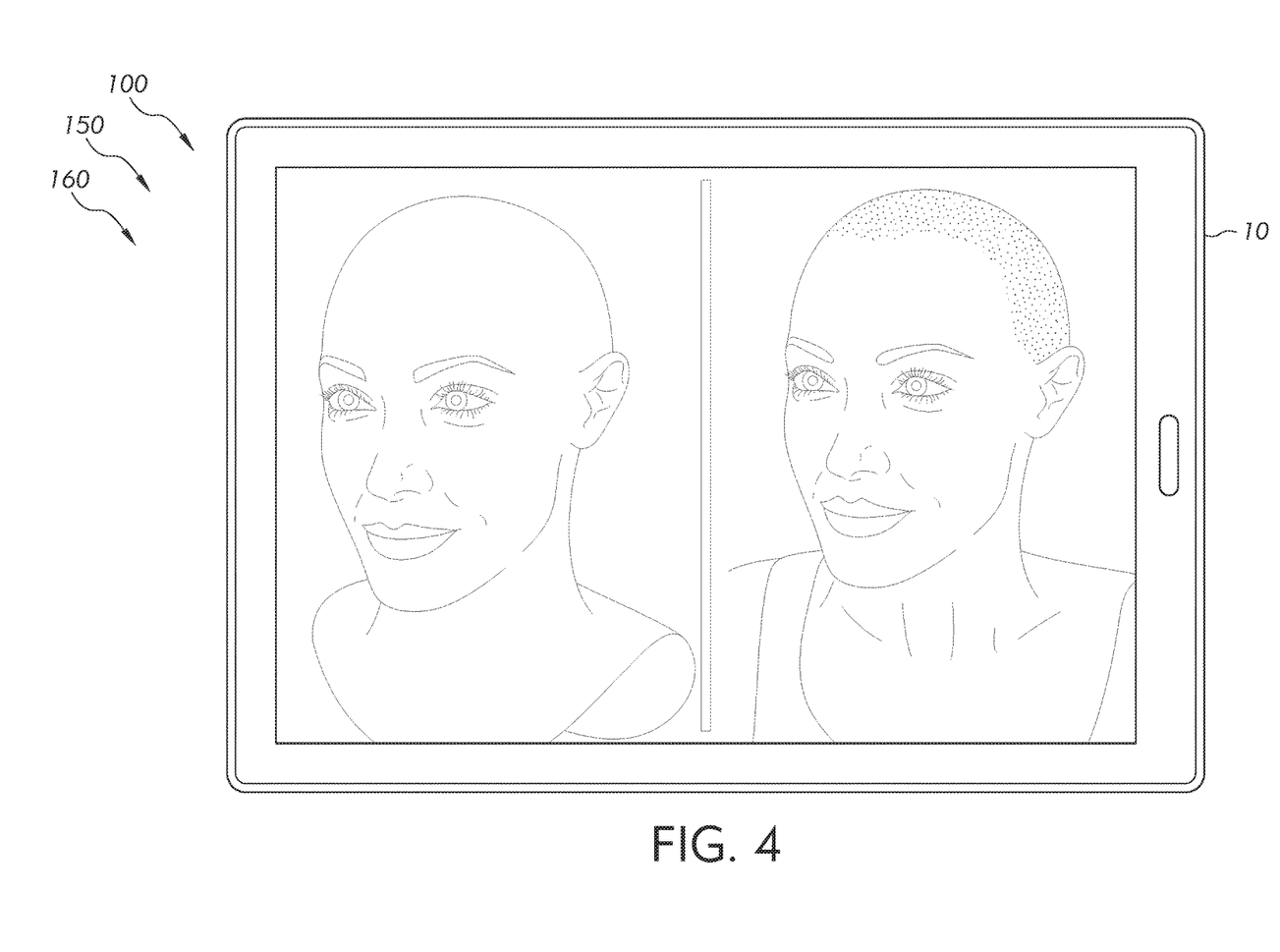
FIG. 4 is a perspective view of the semi-permanent makeup system of FIG. 1, according to an embodiment of the present disclosure.

FIG. 4 is a perspective view of the semi-permanent makeup system of FIG. 1, according to an embodiment of the present disclosure. The makeup simulation unit 160 provides client-users 140 with various color, shape and style selections for creating a desired semi-permanent makeup result. The makeup simulation unit 160 calculates and provides the colors, the shapes and the style selections based on facial shape and face features. The data control unit analyzes client-user input 140. The makeup simulation unit 160 allows the client-user 140 to view semi-permanent makeup requests on the three-dimensional client face from various viewpoints. The computer program 120 further displays three-dimensional client face in a plurality of differing virtual perspectives and settings from an outside perspective. The three-dimensional client face shape is rotatable by 360 degrees for viewing desired procedure results.

Figure 5:
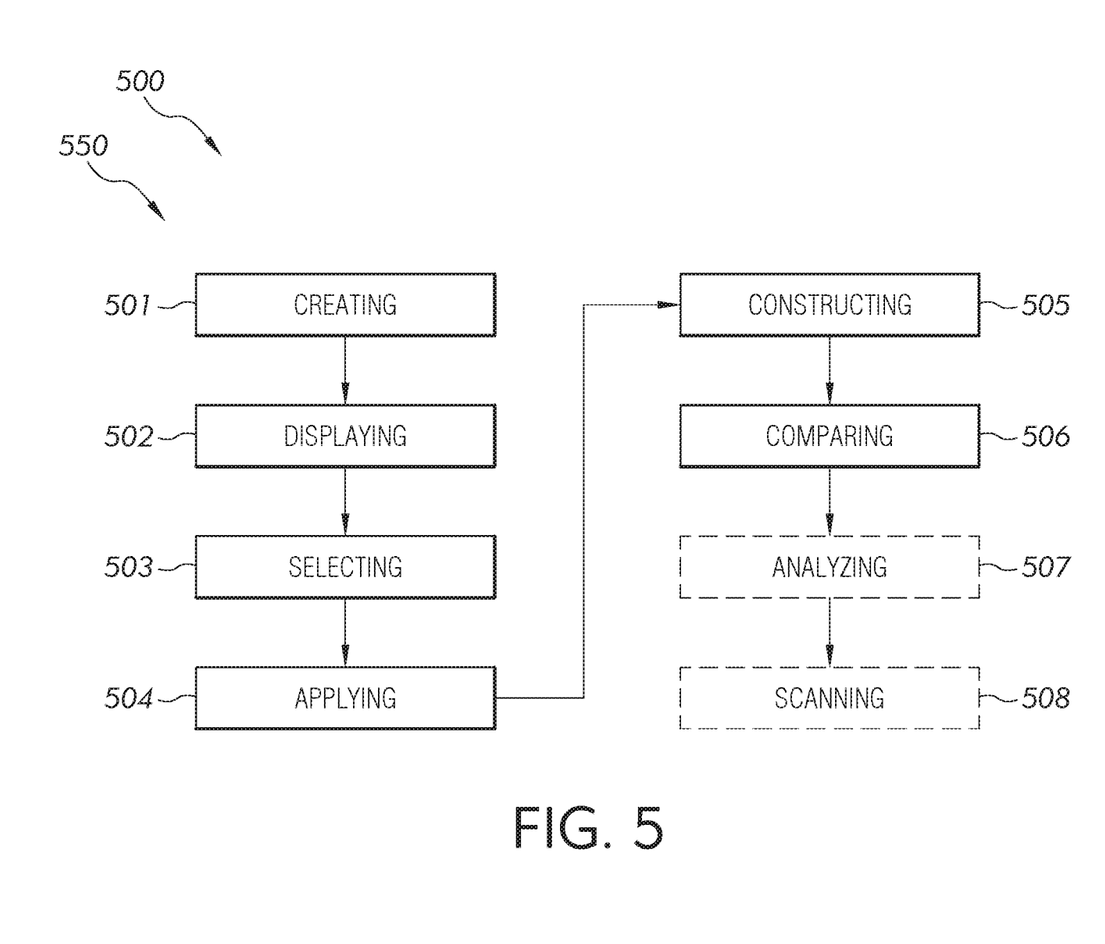
FIG. 5 is a flow diagram illustrating a method of use for the semi-permanent makeup system, according to an embodiment of the present disclosure.

FIG. 5 is a flow diagram illustrating a method 500 for semi-permanent makeup application, according to an embodiment of the present disclosure. In particular, the method for semi-permanent makeup application may include one or more components or features of the semi-permanent makeup system 100 as described above. As illustrated, the method 500 for semi-permanent makeup application may include the steps of: step one 501, creating a three-dimensional facial image of a client-user 140; step two 502, displaying the three-dimensional facial image of the client-user 140 on a displaying device 10; step three 503, selecting semi-permanent make-up options; step four 504, applying the semi-permanent make-up options on the three-dimensional facial image of the client-user 140; step five 505, constructing a stencil for application of the semi-permanent make-up options on the client-user 140; step six 506, comparing procedure results to the three-dimensional facial image of the client-user 140; step seven 507, analyzing procedure results; and step eight 508, scanning prior to follow-up touch-ups of semi-permanent makeup. Tangible outcome is provided when the client receives the semi-permanent makeup.

It should be noted that steps seven 507 and step eight 508 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for semi-permanent makeup application (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The invention claimed is:

1. A method of applying semi-permanent makeup, the method comprising the steps of:
   using a system comprising:
      a server;
      a computer program including;
      a client database;
      a makeup simulation unit;
      and a data control unit;
         wherein said semi-permanent makeup system comprises said server and said computer program;
         wherein said computer program comprises said client database, said makeup simulation unit and said data control unit;
   to create a three-dimensional facial image of a client-user;
   displaying said three-dimensional facial image of said client-user on a displaying device;
   selecting semi-permanent make-up options;
   applying said semi-permanent make-up options on said three-dimensional facial image of said client-user;
   constructing a stencil for application of said semi-permanent make-up options on said client-user;
   using said makeup simulation unit for applying by a technician said semi-permanent makeup to said client based on client-user requests;
   wherein said data control unit analyzes user input;
   wherein said semi-permanent makeup system allows said users to apply semi-permanent makeup on said three-dimensional client face prior to a procedure,
   help said technician accurately create a stencil, compare results with said three-dimensional client face having said semi-permanent makeup client-user requests applied in a tangible form;
   wherein said semi-permanent makeup options comprise one or more of lip extension makeup, eyebrow makeup, receding hairline correction, and baldness correction tattoos;
   wherein said client database stores images of said client-users during stages of procedures for referring to after said procedure and comparing result accuracy after said procedure to client requests and input prior to said procedures.

2. The method of claim 1, wherein said three-dimensional client face shape data is created from a plurality of videos and images of said client-user.

3. The method of claim 1, wherein said makeup simulation unit allows client-user to create eyebrows based on current makeup application and select eyebrow colors.

4. The method of claim 1, wherein said makeup simulation unit analyzes the condition of said client-user's semi-permanent makeup application in order to accurately touch up areas.

5. The method of claim 1, wherein said makeup simulation unit allows said client-user to view semi-permanent makeup requests on said three-dimensional client face from various viewpoints.

6. The method of claim 1, wherein said semi-permanent makeup system uses said semi-permanent makeup requests to create said three-dimensional client face with said semi-permanent makeup applied and a technician then creates a stencil.

7. The method of claim 1, wherein said computer program displays, on a displaying device, simulated effect of said semi-permanent makeup system based on said user requests.

8. The method of claim 1, wherein said computer program further displays three-dimensional client face in a plurality of differing virtual perspectives and settings from an outside perspective.

9. The method of claim 1, wherein said makeup simulation unit calculates and provides said colors, said shapes and said style selections based on facial shape and face features.

10. The method of claim 1, wherein said three-dimensional client face shape is rotatable by 360 degrees for viewing desired procedure results.

11. The method of claim 1, wherein said computer program provides split screen options for comparing images of said three-dimensional client face before said procedure with semi-permanent makeup options applied after said procedure.

12. The method of claim 1, further comprising the steps of: analyzing procedure results; and scanning prior to follow-up touch-ups of semi-permanent makeup.

13. A method of applying semi-permanent makeup, the method comprising the steps of:
   using a system comprising:
      a server;
      a computer program including;
      a client database;
      a makeup simulation unit;
      and a data control unit;
         wherein said semi-permanent makeup system comprises said server and said computer program;
         wherein said computer program comprises said client database, said makeup simulation unit and said data control unit;
   to create a three-dimensional facial image of a client-user;
   displaying said three-dimensional facial image of said client-user on a displaying device;
   selecting semi-permanent make-up options;
   applying said semi-permanent make-up options on said three-dimensional facial image of said client-user;
   constructing a stencil for application of said semi-permanent make-up options on said client-user;
   using said makeup simulation unit for applying by a technician said semi-permanent makeup to said client based on client-user requests;
   wherein said data control unit analyzes user input;
   wherein said semi-permanent makeup system allows said users to apply semi-permanent makeup on said three-dimensional client face prior to a procedure,
   help said technician accurately create a stencil, compare results with said three-dimensional client face having said semi-permanent makeup client-user requests applied in a tangible form;
   wherein said semi-permanent makeup options comprise one or more of lip extension makeup, eyebrow makeup, receding hairline correction, and baldness correction tattoos;
   wherein said client database stores images of said client-users during stages of procedures for referring to after said procedure;
   and scanning prior to follow-up touch-ups of said semi-permanent makeup.

14. The method of claim 13, wherein said makeup simulation unit allows client-user to create eyebrows based on current makeup application and select eyebrow colors.

15. The method of claim 13, wherein said makeup simulation unit analyzes the condition of said client-user's semi-permanent makeup application in order to accurately touch up areas.

16. The method of claim 13, wherein said makeup simulation unit allows said client-user to view semi-permanent makeup requests on said three-dimensional client face from various viewpoints.

17. The method of claim 13, wherein said semi-permanent makeup system uses said semi-permanent makeup requests to create said three-dimensional client face with said semi-permanent makeup applied and a technician then creates a stencil.

18. The method of claim 13, wherein said computer program displays, on a displaying device, simulated effect of said semi-permanent makeup system based on said user requests.

19. The method of claim 13, wherein said makeup simulation unit calculates and provides said colors, said shapes and said style selections based on facial shape and face features.

20. The method of claim 13, wherein said computer program provides split screen options for comparing images of said three-dimensional client face before said procedure with semi-permanent makeup options applied after said procedure.

* * * * *